(12) United States Patent
Kato et al.

(10) Patent No.: US 7,244,297 B2
(45) Date of Patent: Jul. 17, 2007

(54) WATER BASED INK SET FOR INK-JET RECORDING AND INKJET RECORDING METHOD

(75) Inventors: Ryuji Kato, Aisai (JP); Noriatsu Aoi, Ichinomiya (JP); Narumi Kawai, Nagoya (JP); Tomoyo Hamajima, Nagoya (JP); Masaya Fujioka, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 146 days.

(21) Appl. No.: 11/255,033

(22) Filed: Oct. 19, 2005

(65) Prior Publication Data

US 2006/0082630 A1    Apr. 20, 2006

(30) Foreign Application Priority Data

Oct. 20, 2004    (JP) .............................. 2004-305514

(51) Int. Cl.
*C09D 11/02* (2006.01)
*B41J 2/01* (2006.01)

(52) U.S. Cl. .................... 106/31.27; 106/31.6; 347/100

(58) Field of Classification Search ............. 106/31.27, 106/31.28, 31.6; 347/100
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 6,843,840 | B2 * | 1/2005 | Kataoka et al. ............ 106/31.6 |
| 7,159,976 | B2 * | 1/2007 | Kawamura et al. ....... 106/31.13 |
| 2003/0116055 | A1 * | 6/2003 | Kubota et al. ........... 106/31.27 |
| 2005/0041082 | A1 * | 2/2005 | Kataoka ..................... 347/100 |
| 2005/0243126 | A1 * | 11/2005 | Takahashi et al. ............. 347/40 |
| 2006/0017759 | A1 * | 1/2006 | Matsuzawa et al. .......... 347/15 |
| 2006/0017760 | A1 * | 1/2006 | Matsuzawa et al. .......... 347/15 |
| 2006/0017761 | A1 * | 1/2006 | Matsuzawa et al. .......... 347/15 |
| 2006/0017767 | A1 * | 1/2006 | Matsuzawa et al. .......... 347/21 |
| 2006/0082629 | A1 * | 4/2006 | Kato et al. ................ 106/31.27 |
| 2006/0109323 | A1 * | 5/2006 | Pallen et al. ............. 106/31.27 |

FOREIGN PATENT DOCUMENTS

| JP | H8-3498 | | 1/1996 |
| JP | 09/025442 | * | 1/1997 |
| JP | 2000-513396 | | 10/2000 |
| JP | 2001-354886 | | 12/2001 |
| JP | 2002/241661 | * | 8/2002 |

OTHER PUBLICATIONS

English translation of JP 09/025442, Jan. 1997.*
English translation of JP 2001/354886, Dec. 2001.*
English translation of JP 2002/241661, Aug. 2002.*

* cited by examiner

*Primary Examiner*—Helene Klemanski
(74) *Attorney, Agent, or Firm*—Reed Smith LLP

(57) ABSTRACT

A water based ink set for ink-jet recording has a yellow ink, a magenta ink and a cyan ink each having at least a coloring agent, water and a water soluble organic solvent. The coloring agent of each of the black ink and the red ink is a pigment and the coloring agent of each of the yellow ink, the magenta ink and the cyan ink is a water soluble dye. The black ink and the red ink each have a dynamic surface tension at a lifetime of 100 ms of 40 mN/m or more and 45 mN/m or less as measured by a maximum bubble pressure method at 25° C.

10 Claims, No Drawings

WATER BASED INK SET FOR INK-JET RECORDING AND INKJET RECORDING METHOD

BACKGROUND OF THE INVENTION

1. Field of the Invention

The present invention relates to a water based ink set for ink-jet recording and to an ink-jet recording method.

2. Description of the Related Art

An ink-jet recording system has been widely used for color-printing digital color image data. In order to achieve vivid color reproducibility, a water based ink set for ink-jet recording has been employed as ink-jet inks. The water based ink set comprises a magenta ink, a yellow ink and a cyan ink which are each prepared by dissolving a water soluble dye into a mixed solvent of water and water soluble organic solvents. In some cases, in order to print text data such as alphabet character data and Chinese character data, a dye based black ink is added to the water based ink set for ink-jet recording.

Recently, sharp text print quality has been desired in which blurring such as feathering is suppressed as much as possible. Additionally, a print quality close to photo image quality has been desired in which vivid color reproducibility and excellent lightfastness are implemented. However, if water soluble dyes are employed as coloring agents for all the inks of a water based ink set for ink-jet recording, feathering in text is unfavorably noticeable.

In order to implement sharp text, Japanese Patent Application Laid-Open No. 2001-354886 discloses an ink set for ink-jet recording comprising, in addition to the three primary color inks (yellow, magenta and cyan inks), three additional color inks (black, red and green inks), all of which are composed of pigment based inks.

If all of the inks of the ink set are composed of pigment based inks, the ink-jet image exhibits excellent lightfastness and excellent sharpness of text. However, although the additional black, red and green inks are employed together, the color reproducibility of the ink-jet image is not satisfactory as compared to that of the ink-jet image obtained by use of an ink set composed of dye based inks employing water soluble dyes. In addition, the number of nozzles of an ink-jet head must be increased, resulting in the problem of cost increase.

Thus, as an ink configuration which implements both sharp text print quality and vivid color reproducibility close to photo quality, a water based ink set for ink-jet recording has been commercially available which employs a pigment as a coloring agent for a black ink in which the print quality of text is of importance, and employs water soluble dyes as coloring agents for the color inks (e.g., yellow ink, magenta ink and cyan ink) in which color reproducibility is of importance.

However, when text data is printed by use of the water based ink set for ink-jet recording having the above-described ink configuration, red color, which is the second most frequently used color next to black color, is expressed by superposing the dye based yellow ink and the dye based magenta ink which both contain water soluble dyes. Therefore, feathering caused by a landing error of the superposition is noticeable. In addition, the degree of the feathering of the red color printed by use of the inks each employing the water soluble dye as the coloring agent is different from that of the black color printed by use of the pigment ink. Moreover, the water resistance and the lightfastness of the red color are worse than those of the black color. With respect to the water resistance, for example, blurring of a text document printed in an office is likely to occur due to sweat of a human hand or water such as a water drop from a drink, and also migration (blurring caused by moisture) tends to occur. With respect to the lightfastness, the fading of the red color caused by exposure to illumination light or sunlight becomes noticeable in a text document posted for a long period of time, and thus the letters become hard to read. A red color is often used for correction and letters to be emphasized, since it is more visually prominent than the other colors, and thus a print quality equivalent to that of the black color is required for a red color. However, under the present circumstances, since a red color is expressed by superposing a yellow ink and a magenta ink each employing a water soluble dye as a coloring agent, the print quality of the red color is significantly different from that of the black color expressed by a black ink employing a pigment as a coloring agent.

SUMMARY OF THE INVENTION

The present invention has been made to solve the above problems, and it is an object of the present invention to provide a water based ink set suitable for ink-jet recording and having suppressed feathering on the edges of objects in text data to be printed in black and in red, to provide improved water resistance and lightfastness of the printed objects, as well as excellent color reproducibility and to also provide an ink-jet recording method using the same.

The present inventors have found that, by adding a red ink employing a pigment as a coloring agent to a water based ink set for ink-jet recording, the ink set comprising a black ink employing a pigment as a coloring agent and a yellow ink, a magenta ink and a cyan ink each employing a water soluble dye as a coloring agent, and by using the black ink and the red ink for printing text data in black and in red, respectively, feathering on the edges of objects in text data printed in black and in red is suppressed, and the water resistance and the lightfastness of the printed objects are improved. Additionally, the print quality of the red color is equivalent to that of the black color, and excellent color reproducibility is obtained. Thus, the present invention has been completed.

Therefore, the present invention provides a water based ink set for ink-jet recording having a black ink, a red ink, a yellow ink, a magenta ink and a cyan ink each comprising at least a coloring agent, water and a water soluble organic solvent, wherein the coloring agent of each of the black ink and the red ink is a pigment, and the coloring agent of each of the yellow ink, the magenta ink and the cyan ink is a water soluble dye.

In addition, the present invention provides an ink-jet recording method for carrying out ink-jet recording by ejecting inks from an ink-jet head to adhere the inks to a recording material, where the inks constitute a water based ink set for ink-jet recording having at least a black ink containing a pigment as a coloring agent, a magenta ink containing a water soluble dye as a coloring agent, a yellow ink containing a water soluble dye as a coloring agent and a cyan ink containing a water soluble dye as a coloring agent, wherein a red ink containing a pigment as a coloring agent is added to the water based ink set for ink-jet recording. In the recording method, the black ink and the red ink are used for printing text data to be printed in black and in red, respectively.

In the water based ink set for ink-jet recording and the ink-jet recording method of the present invention, a red ink employing a pigment as a coloring agent is added to a water based ink set for ink-jet recording having a black ink employing a pigment as a coloring agent, and a yellow ink, a magenta ink and a cyan ink each employing a water soluble dye as a coloring agent. The black ink and the red ink are used for printing text data to be printed in black and in red, respectively. Thus, feathering on the edges of objects in text data printed in black and in red is reduced, and the water resistance and lightfastness of the printed objects are improved. In addition, the print quality of the red color is equivalent to that of the black color, and excellent color reproducibility is obtained.

DETAILED DESCRIPTION OF PREFERRED EMBODIMENTS

The water based ink set for ink-jet recording of the present invention comprises a black ink, a red ink, a yellow ink, a magenta ink and a cyan ink each comprising at least a coloring agent, water, and a water soluble organic solvent. When text data is printed, the print quality of objects in the text data printed in black and in red is important. The black ink and the red ink, which are employed for printing the objects in the text data to be printed in black and in red, employ a pigment as the coloring agent since the pigment based inks exhibit reduced feathering and excellent lightfastness and water resistance. On the other hand, a water soluble dye exhibiting excellent color reproducibility is employed as the coloring agent for the yellow ink, the magenta ink and the cyan ink. Therefore, the water based ink set for ink-jet recording according to the present invention provides reduced feathering on the edges of the objects in the text data printed in black and in red, improved water resistance and lightfastness of the printed objects, a print quality of the red color equivalent to that of black, and excellent color reproducibility. Moreover, each of the inks in the water based ink set for ink-jet recording of the present invention can be prepared by uniformly mixing the coloring agent, water and the water soluble organic solvents by means of routine methods. An ink having different color may be added to the ink set in accordance with need.

In the present invention, the red color is a color having a hue angle ranging from about 5° to about 60° in the L*a*b* calorimetric system standardized by CIE (Commission Internationale de l'Eclairage), and the red ink is an ink which can express the abovementioned red color by the ink itself. The number of pigments employed in the red ink is not limited to one, and a mixture of two or more pigments may be employed provided the hue angle can be adjusted within a range from about 5° to about 60°.

Specific examples of the pigment employed in the black ink include carbon blacks such as MA8, MA100 (available from Mitsubishi Chemical Corporation), and color black FW200 (available from Degussa). In addition, a self-dispersing type carbon black which can disperse in water without using a dispersing agent may be employed as the carbon black. The self-dispersing type pigment can be obtained by subjecting a pigment to a surface treatment such that at least one hydrophilic group such as a carbonyl group, a carboxyl group, a hydroxyl group, and a sulfone group, and a salt thereof is used such that the group is bonded to the surface of the pigment. Examples of the self-dispersing pigment include a pigment surface-treated by means of methods disclosed in Japanese Patent Application Laid-Open No. Hei 8-3498 (corresponding to U.S. Pat. No. 5,609,671) and in Japanese Translation of PCT international application No. 2000-513396 (corresponding to WO97/48769). In addition, a commercial product such as CAB-O-JET (a registered trade mark) 200, 300 (available from Cabot Corporation), or BONJET (a registered trade mark) CW1 (available from Orient Chemical Industries, Ltd.) may be employed as the self-dispersing black pigment.

Examples of the pigment employed in the red ink include C. I. pigment reds 23, 144, 170, 177, 221, 254 and 264. Moreover, the red color may be expressed by mixing a magenta based pigment with a yellow based pigment. In this case, examples of the yellow based pigment include C. I. pigment yellows 3, 13, 74, 83 and 154, and examples of the magenta based pigment include C. I. pigment reds 5, 48, 112, 122, 202 and 207. The above examples are only preferred pigments suitable for the present invention, and the present invention is not limited thereto.

The content of the pigment contained in each of the black ink and the red ink depends on an intended printing density, color and the like. However, when the content of the pigment is too low, the color can not be satisfactorily reproduced on paper. When the content is too high, the nozzle of an ink-jet head tends to become clogged. Thus, the content of the pigment with respect to the total amount of the corresponding ink is within the range of preferably about 1 wt % to about 10 wt %, more preferably about 1 wt % to about 7 wt %.

A pigment dispersing agent may be added to each of the black ink and the red ink for maintaining the dispersion stability thereof. Examples of the dispersing agent include a polymer dispersing agent and a surfactant. Examples of the polymer dispersing agent include proteins such as gelatin and albumin; natural gums such as gum arabic and tragacanth; glucosides such as saponin; cellulose derivatives such as methyl cellulose, carboxy cellulose and hydroxy methyl cellulose; natural-occurring polymers such as lignin sulfonate and shellac; anionic polymers such as salts of polyacrylic acid, salts of styrene-acrylic acid copolymer, salts of vinylnaphthalene-acrylic acid copolymer, salts of styrene-maleic acid copolymer, salts of vinylnaphthalene-maleic acid copolymer, and a sodium salt and a phosphate of β-naphthalenesulfonic acid formalin condensate; and nonionic polymers such as polyvinyl alcohol, polyvinyl pyrrolidone and polyethylene glycol. Examples of the surfactant include anionic surfactants such as higher alcohol sulfate ester salts, liquid fatty oil sulfate ester salts and alkyl allyl sulfonates; and nonionic surfactants such as polyoxyethylene alkyl ether, polyoxyethylene alkyl ester, sorbitan alkyl ester and polyoxyethylene sorbitan alkyl ester. The above dispersing agents may be used singly or in combination of two or more thereof in accordance with need.

A suitable content of the above dispersing agents, in accordance with the kind of pigment and the kind of dispersing agent, is appropriately determined so as to properly function as a dispersing agent. If the content of the dispersing agent is too low, the dispersion stability of the pigment is insufficient. If the content of the dispersing agent is too high, the viscosity of the ink increases to cause difficulty in ejecting the ink from an ink-jet head. Thus, the content of the dispersing agent with respect to the amount of the pigment is within the range of preferably about 5 wt % to about 50 wt % and more preferably about 10 wt % to about 40 wt %.

When the pigment is used in preparing the black ink or the red ink, preferably, the pigment is further dispersed by means of a dispersing apparatus. No particular limitation is imposed on the dispersing apparatus used for dispersing the pigment so long as it is a dispersing apparatus of the general type. Examples of the dispersing apparatus include a ball mill, a roll mill and a sand mill. Of these, a sand mill of a high speed type is preferred.

On the other hand, in the water based ink set for ink-jet recording of the present invention, a water soluble dye is employed as the coloring agent for the yellow ink, the magenta ink and the magenta ink, as described above. Any water soluble dye may be employed as the water soluble dye employed for the yellow ink, the magenta ink and the cyan ink, so long as it satisfies required clarity, water solubility, stability, lightfastness and other required properties. Examples of the water soluble dye include direct dyes, acid dyes, basic dyes and reactive dyes. Also, examples of the preferred dye include, if classified according to the structure of the dye, azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes and metal phthalocyanine dyes.

Specific examples of the direct dye include C. I. direct yellows 12, 24, 26, 27, 28, 33, 39, 58, 86, 98, 100, 132 and 142; C. I. direct reds 4, 17, 28, 37, 63, 75, 79, 80, 83, 99, 220, 224 and 227; C. I. direct violets 47, 48, 51, 90 and 94; and C. I. direct blues 1, 6, 8, 15, 22, 25, 71, 76, 80, 86, 90, 106, 108, 123, 163, 165, 199 and 226. Specific examples of the acid dye include C. I. acid yellows 3, 11, 17, 19, 23, 25, 29, 38, 42, 49, 59, 61, 71 and 72; C. I. acid reds 1, 6, 8, 17, 18, 32, 35, 37, 42, 51, 52, 57, 80, 85, 87, 92, 94, 115, 119, 131, 133, 134, 154, 181, 186, 249, 254, 256, 289, 315, 317 and 407; C. I. acid violets 10, 34, 49 and 75; and C. I. acid blues 9, 22, 29, 40, 59, 62, 93, 102, 104, 113, 117, 120, 167, 175, 183, 229 and 234. Specific examples of the basic dye include C. I. basic yellow 40; C. I. basic reds 1, 2, 9, 12, 13, 14 and 37; C. I. basic violets 7, 14 and 27; and C. I. basic blues 1, 3, 5, 7, 9, 24, 25, 26, 28 and 29. Specific examples of the reactive dye include C. I. reactive yellows 2, 3, 13 and 15; C. I. reactive reds 4, 23, 24, 31, 56 and 180; and C. I. reactive blues 7, 13 and 21.

If the content of the water soluble dye contained in each of the yellow ink, the cyan ink and the magenta ink is too low, the color reproducibility is unsatisfactory on a recording material. If the content is too high, a nozzle of an ink-jet head tends to become clogged. Thus, the content of the water soluble dye with respect to the total amount of the corresponding ink is within the range of preferably about 0.1 wt % to about 10 wt %, more preferably about 0.3 wt % to about 10 wt % and particularly preferably about 0.5 wt % to about 7 wt %.

In the ink set for ink-jet recording of the present invention, the water employed in each of the inks is not ordinary water containing ions, but is preferably deionized water. The content of the water in the ink, in accordance with the kind and the composition of the water soluble organic solvents employed together and the desired ink properties, is determined over a wide range. When the content of water is too low, the viscosity of the ink increases to cause difficulty in ink ejection from an ink-jet head. When the content is too high, the coloring agent is precipitated or aggregated due to the evaporation of water, and thus a nozzle of an ink-jet head tends to become clogged. Therefore, the content of the water with respect to the total amount of the corresponding ink is within the range of preferably about 10 wt % to about 95 wt %, more preferably about 10 wt % to about 80 wt % and particularly preferably about 20 wt % to about 80 wt %.

In an ink-jet recording method of the present invention, the water soluble organic solvents employed in each of the inks are broadly categorized into a humectant and a penetrant. A water soluble organic solvent employed as the humectant is added to the ink to prevent clogging of the nozzle of an ink-jet head, and a water soluble organic solvent employed as the penetrant is added to the ink to facilitate the rapid penetration of the ink into a recording material upon printing.

Specific examples of the humectant employed for such a purpose include water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol and 1,6-hexanediol. When the content of the water soluble organic solvent serving as the humectant is too low, the clogging of a nozzle of an ink-jet head cannot be sufficiently prevented. When the content is too high, the viscosity of the ink increases to cause difficulty in ink ejection from an ink-jet head. Therefore, the content of the water soluble organic solvent serving as the humectant with respect to the total amount of the corresponding ink is within the range of preferably about 5 wt % to about 50 wt %, more preferably about 10 wt % to about 40 wt %, particularly preferably about 15 wt % to about 35 wt %.

Specific examples of the penetrant employed for the abovementioned purpose include glycol ethers typified by ethylene glycol-based and propylene glycol-based alkyl ethers. Specific examples of the ethylene glycol-based alkyl ether include ethylene glycol methyl ether, ethylene glycol-n-ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol-n-ethyl ether, triethylene glycol-n-propyl ether, triethylene glycol-n-butyl ether and triethylene glycol isobutyl ether. Specific examples of the propylene glycol-based alkyl ether include propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether and tripropylene glycol-n-butyl ether.

When the content of the water soluble organic solvent serving as the penetrant is too low, the penetrability is unsatisfactory. When the content is too high, the penetrability becomes excessively high, and thus blurring such as feathering tends to occur. Therefore, the content of the water soluble organic solvent serving as the penetrant with respect to the total amount of the corresponding ink is preferably about 1 wt % to about 10 wt %, more preferably about 1 wt % to about 7 wt %.

Further, in addition to the humectant and the penetrant, still another water soluble organic solvent may be employed for other purposes such as the prevention of the ink from drying in the end portion of an ink-jet head, the improvement of the printing density and the implementation of the vivid color reproduction. Examples of such water soluble organic solvent include lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; glycerin; pyrrolidones such as 2-pyrrolidone and N-methyl-2-pyrrolidone; and 1,3-dimethyl-2-imidazolidinone.

In the ink set for ink-jet recording of the present invention, the basic composition of each of the black ink, the red ink, the yellow ink, the magenta ink and the cyan ink is as described above. However, other conventionally known surfactants; viscosity modifiers such as polyvinyl alcohol and cellulose; surface tension modifiers; antimold agents; anticorrosive agents; or the like may be added to each of the inks in accordance with need.

In the ink set for ink-jet recording of the present invention, the inks preferably employed as the black ink and the red ink have a dynamic surface tension at a lifetime of 100 ms of preferably 40 mN/m or more and 45 mN/m or less as measured by a maximum bubble pressure method at 25° C. The reason for employing a black ink and a red ink having such a dynamic surface tension will be described hereinbelow.

It has been known that the dynamic surface tension of a liquid such as an ink is generally measured by an oscillating jet method, a meniscus method, the maximum bubble pressure method or other method. The value of the dynamic surface tension employed in the present invention is measured by means of the maximum bubble pressure method; for example, the dynamic surface tension can be determined by means of an automatic dynamic surface tension meter BP-D4 (available from Kyowa Interface Science Co., LTD.). In the measurement of the dynamic surface tension by means of the maximum bubble pressure method, a gas is supplied from a gas supplying source to a probe to generate gas bubbles from the end of the probe which is immersed in an ink. In this method, the generation rate of the gas bubble is changed by changing the flow rate of the gas. The pressure on the gas bubble from the ink is changed along with the gas bubble generation rate change, and the surface tension is determined based on the pressure change. The pressure reaches the maximum (the maximum bubble pressure) when the radius of the gas bubble becomes equal to the radius of the end portion of the probe. Thus, the surface tension σ of the ink is represented by the following equation.

$$\sigma = (\Delta P \cdot r)/2 \quad \text{(Eq. 1)}$$

In the Eq. 1, $r$ is the radius of the end portion of the probe, and $\Delta P$ is the difference between the maximum pressure and the minimum pressure on the gas bubble. The maximum value of the pressure (the maximum bubble pressure) is a value of the pressure when the radius of curvature of the gas bubble is equal to the radius of the end portion of the probe. The term of "lifetime", as used herein, refers to a period of time starting from when the gas bubble is caused to be separated away from the probe to form a new surface after the pressure reaches the maximum bubble pressure to when the pressure again reaches the maximum bubble pressure.

The dynamic surface tension of a liquid such as an ink is different from the static surface tension, and is the surface tension at a lifetime of the order of several tens to several thousands of ms. Thus, the dynamic surface tension is considered to have a considerable influence on the ink penetrability into a recording material when the ink adheres thereto or is landed thereon. When the dynamic surface tension is high, the ink penetrability into the recording material is low. Therefore, the feathering is improved, but the drying characteristics of the ink on the recording material are lowered. On the other hand, when the dynamic surface tension is low, the ink penetrability into a recording material is high. Therefore, feathering becomes more noticeable, but the drying characteristics of the ink on the recording material are improved. In a general ink-jet recording method, the penetration phenomenon of an ink-jet ink into a recording material after the ink is landed on the recording material is completed in the order of several tens of ms. Therefore, in the present invention, by taking into account the measurement errors or the like of a dynamic surface tension measurement apparatus, the value of the dynamic surface tension at a lifetime of 100 ms is employed since the measurement accuracy becomes stable thereat.

According to the results of studies on ink compositions by the present inventors, it has been found that, as the black ink and the red ink, in which print quality is of importance and which are employed for printing objects in text data to be printed in black and in red, respectively, a black ink and a red ink are preferably employed which each contain as the coloring agent a pigment providing suppressed feathering, better lightfastness and better water resistance than a water soluble ink does, and which have a dynamic surface tension at a lifetime of 100 ms of preferably 40 mN/m or more and 45 mN/m or less as measured by a maximum bubble pressure method at 25° C. Therefore, better print quality of text data can be obtained in which feathering is further reduced and drying characteristics on a recording material are further improved. When the dynamic surface tension is less than 40 mN/m, the feathering tends to deteriorate. When the dynamic surface tension exceeds 45 mN/m, the drying characteristics of the ink on a recording material tend to deteriorate.

Next, the ink-jet recording method of the present invention will be described below which employs the ink set for ink-jet recording of the present invention.

In the ink-jet recording method of the present invention, the ink-jet recording is performed by ejecting inks from an ink-jet head to adhere the inks to a recording material. The inks are part of a water based ink set for ink-jet recording comprising at least a black ink containing a pigment as a coloring agent, a magenta ink containing a water soluble dye as a coloring agent, a yellow ink containing a water soluble dye as a coloring agent and a cyan ink containing a water soluble dye as a coloring agent. The ink-jet recording method of the present invention is characterized in that a red ink containing a pigment as a coloring agent is added to the water based ink set for ink-jet recording such that the method uses the black ink and the red ink for printing text data to be printed in black and in red, respectively. In the ink-jet recording method of the present invention, the red ink employing a pigment as the coloring agent is added to the water based ink set for ink-jet recording comprising a black ink employing a pigment as the coloring agent, and a yellow ink, a magenta ink and a cyan inks each employing a water soluble dye as the coloring agent, and the black ink and the red ink are used for printing text data to be printed in black and in red, respectively. Thus, the feathering on the edges of objects in text data printed in black and in red is reduced, and the water resistance and lightfastness of the printed objects are improved. In addition, the print quality of the red color is equivalent to that of the black color, and excellent color reproducibility is achieved.

In the ink-jet recording method of the present invention, a recording material and an ink-jet head which are used in a conventional ink-jet recording method may be employed, if necessary.

In the ink-jet recording method of the present invention, the dye based yellow, magenta and cyan inks are used for reproducing color image data, and the pigment based black and red inks are used for reproducing text data to be printed in black and in red, respectively. In the thus-reproduced ink-jet image, the color reproducibility is excellent, and not only the black color but also the red color in text is sharply expressed. In addition, excellent lightfastness and water resistance can be obtained. Preferably, one of the black ink and the red ink is employed only for printing text data. However, more preferably, both the black ink and the red ink are employed only for printing text data, since both the black color and the red color in text are further sharply expressed.

EXAMPLES

The present invention will be described below in detail by referring to Examples and Comparative Examples, but the present invention is not limited to these Examples. Various changes, modifications and improvements may be made based on the knowledge of a person skilled in the art, as long as they do not depart from the scope of the present invention.

First, Preparation of each of the inks composing the ink set for ink-jet recording will be described. The compositions of the respective inks with respect to the total amount of the ink after preparation are shown in Tables 1 and 2. The ink compositions shown in Tables 1 and 2 represent the actual ink component blending amounts contained in the total amount of the corresponding ink in weight percent.

The pigment based black inks and the pigment based red inks were subjected to dynamic surface tension measurement at a lifetime of 20 to 5000 ms at 25° C. by means of an automatic dynamic surface tension meter BP-D4 (available from Kyowa Interface Science Co., Ltd.), and the value of the dynamic surface tension at a lifetime of 100 ms was read. The results are shown in Table 1.

Preparation of Pigment Based Black Ink 1

39 parts by weight of water (ion-exchanged water), 25.5 parts by weight of glycerin, 2 parts by weight of dipropylene glycol-n-propyl ether (hereinafter referred to as DPGPE) and 0.5 parts by weight of propylene glycol-n-propyl ether were mixed to prepare 67 parts by weight of an ink solvent. The obtained ink solvent (67 parts by weigh) was gradually added to 33 parts by weight of CAB-O-JET (a registered trade mark) 300 (carbon black concentration: 15%, available from Cabot Corporation) under stirring. The mixture was continued to stir for 30 minutes and filtrated with a membrane filter having a pore size of 1 μm to obtain the pigment based black ink 1. The concentration of carbon black with respect to the total amount of the black ink was 5 wt %.

Preparation of Pigment Based Black Ink 2

39 parts by weight of water (ion-exchanged water), 26 parts by weight of glycerin and 2 parts by weight of DPGPE were mixed to prepare 67 parts by weight of an ink solvent. The obtained ink solvent (67 parts by weigh) was gradually added to 33 parts by weight of CAB-O-JET (a registered trade mark) 300 (carbon black concentration: 15%, available from Cabot Corporation) under stirring. The mixture was continued to stir for 30 minutes and filtrated with a membrane filter having a pore size of 1 μm to obtain the pigment based black ink 2. The concentration of carbon black with respect to the total amount of the black ink was 5 wt %.

Preparation of Pigment Based Black Inks 3 to 5

The same procedure as in the Preparation of the pigment based black ink 1 was repeated to prepare the pigment based black inks 3 to 5, except that the concentration of glycerin and DPGPE were changed as listed in Table 1.

Preparation of Dye Based Black Ink 68 parts by weight of water (ion-exchanged water), 24 parts by weight of glycerin and 5 parts by weight of DPGPE were mixed to prepare 97 parts by weight of an ink solvent. Subsequently, 3 parts by weight of food black 2 was added to 97 parts by weight of the ink solvent under stirring. The mixture was continued to stir for 30 minutes and filtrated with a membrane filter having a pore size of 1 μm to prepare the dye based black ink.

Preparation of Pigment Based Red Ink 1

15 parts by weight of C. I. pigment red 254, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a red pigment dispersion.

In addition to the red pigment dispersion, 54 parts by weight of water (ion-exchanged water), 24 parts by weight of glycerin and 2 parts by weight of DPGPE were mixed to prepare 80 parts by weight of an ink solvent. The obtained ink solvent (80 parts by weight) was gradually added to 20 parts by weight of the red pigment dispersion under stirring. The mixture was continued to stir for 30 minutes and filtrated with a membrane filter having a pore size of 1 μm to obtain the pigment based red ink 1. The concentration of C. I. pigment red 254 with respect to the total amount of the ink was 3 wt %.

Preparation of Pigment Based Red Ink 2

15 parts by weight of C. I. pigment red 177, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a red pigment dispersion.

In addition to the red pigment dispersion, 54 parts by weight of water (ion-exchanged water), 24 parts by weight of glycerin and 2 parts by weight of DPGPE were mixed to prepare 80 parts by weight of an ink solvent. The obtained ink solvent (80 parts by weight) was gradually added to 20 parts by weight of the red pigment dispersion under stirring. The mixture was continued to stir for 30 minutes and filtrated with a membrane filter having a pore size of 1 μm to obtain the pigment based red ink 2. The concentration of C. I. pigment red 177 with respect to the total amount of the ink was 3 wt %.

Preparation of Pigment Based Red Ink 3

15 parts by weight of C. I. pigment red 122, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a magenta pigment dispersion.

15 parts by weight of C. I. pigment yellow 74, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a yellow pigment dispersion.

23 parts by weight of the obtained magenta pigment dispersion and 10 parts by weight of the yellow pigment dispersion were mixed and stirred for 10 minutes to obtain a red pigment dispersion.

In addition to the red pigment dispersion, 44 parts by weight of water (ion-exchanged water), 20.5 parts by weight of glycerin and 2.5 parts by weight of DPGPE were mixed to prepare 67 parts by weight of an ink solvent. The obtained ink solvent (67 parts by weight) was gradually added to 33 parts by weight of the red pigment dispersion under stirring. The mixture was continued to stir for 30 minutes and filtrated with a membrane filter having a pore size of 1 μm to obtain the pigment based red ink 3. The concentrations of C. I. pigment red 122 and C. I. pigment yellow 74 with respect to the total amount of the ink were 3.45 wt % and 1.5 wt %, respectively.

Preparation of Pigment Based Red Ink 4

15 parts by weight of C. I. pigment red 264, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a red pigment dispersion.

In addition to the red pigment dispersion, 54 parts by weight of water (ion-exchanged water), 21 parts by weight of glycerin and 5 parts by weight of DPGPE were mixed to prepare 80 parts by weight of an ink solvent. The obtained ink solvent (80 parts by weight) was gradually added to 20 parts by weight of the red pigment dispersion under stirring. The mixture was continued to stir for 30 minutes and filtrated with a membrane filter having a pore size of 1 μm to obtain the pigment based red ink 4. The concentration of C. I. pigment red 264 with respect to the total amount of the ink was 3 wt %.

Preparation of Pigment Based Red Ink 5

54 parts by weight of water (ion-exchanged water), 25 parts by weight of glycerin and 1 part by weight of DPGPE were mixed to prepare 80 parts by weight of an ink solvent. The obtained ink solvent (80 parts by weight) was gradually added to 20 parts by weight of the red pigment dispersion used in the preparation of pigment based red ink 1 under stirring. The mixture was continued to stir for 30 minutes and filtrated with a membrane filter having a pore size of 1 μm to obtain the pigment based red ink 5. The concentration of C. I. pigment red 254 with respect to the total amount of the ink was 3 wt %.

Preparation of Dye Based Red Ink

The same procedure as in the Preparation of the dye based black ink was repeated to obtain the dye based red ink, except that the ink composition was changed as shown in Table 1.

Preparation of Dye Based Yellow Ink

The same procedure as in the Preparation of the dye based black ink was repeated to obtain the dye based yellow ink, except that the ink composition was changed as shown in Table 2.

Preparation of Pigment Based Yellow Ink 54 parts by weight of water (ion-exchanged water), 21 parts by weight of glycerin and 5 parts by weight of DPGPE were mixed to prepare 80 parts by weight of an ink solvent. The obtained ink solvent (80 parts by weight) was gradually added to 20 parts by weight of the yellow pigment dispersion used in the preparation of pigment based red ink 3 under stirring. The mixture was continued to stir for 30 minutes and filtrated with a membrane filter having a pore size of 1 μm to obtain the pigment based yellow ink. The concentration of C. I. pigment red 74 with respect to the total amount of the ink was 3 wt %.

Preparation of Dye Based Magenta Ink

The same procedure as in the Preparation of the dye based black ink was repeated to obtain the dye based magenta ink, except that the ink composition was changed as shown in Table 2.

Preparation of Pigment Based Magenta Ink 49 parts by weight of water (ion-exchanged water), 19 parts by weight of glycerin and 5 parts by weight of DPGPE were mixed to prepare 73 parts by weight of an ink solvent. The obtained ink solvent (73 parts by weight) was gradually added to 27 parts by weight of the magenta pigment dispersion used in the preparation of pigment based red ink 3 under stirring. The mixture was continued to stir for 30 minutes and filtrated with a membrane filter having a pore size of 1 μm to obtain the pigment based magenta ink. The concentration of C. I. pigment red 122 with respect to the total amount of the ink was 4.05 wt %.

Preparation of Dye Based Cyan Ink

The same procedure as in the Preparation of the dye based black ink was repeated to obtain the dye based cyan ink, except that the ink composition was changed as shown in Table 2.

Preparation of Pigment Based Cyan Ink 15 parts by weight of C. I. pigment blue 15:3, 5 parts by weight of polyoxyethylene lauryl ether ammonium sulfate (average polymerization degree of oxyethylene=12), 15 parts by weight of glycerin and 65 parts by weight of water (ion-exchanged water) were mixed. Subsequently, the mixture was subjected to dispersing processing by means of a wet sand mill using zirconia beads having a diameter of 0.3 mm as a medium to thereby obtain a cyan pigment dispersion.

In addition to the cyan pigment dispersion, 54 parts by weight of water (ion-exchanged water), 21 parts by weight of glycerin and 5 parts by weight of DPGPE were mixed to prepare 80 parts by weight of an ink solvent. The obtained ink solvent (80 parts by weight) was gradually added to 20 parts by weight of the cyan pigment dispersion under stirring. The mixture was continued to stir for 30 minutes and filtrated with a membrane filter having a pore size of 1 μm to obtain the pigment based cyan ink. The concentration of C. I. pigment blue 15:3 with respect to the total amount of the ink was 3 wt %.

TABLE 1

|  |  | Black ink (wt %) | | | | | | Red ink (wt %) | | | | | |
| --- | --- | --- | --- | --- | --- | --- | --- | --- | --- | --- | --- | --- | --- |
|  |  | Pigment based black ink 1 | Pigment based black ink 2 | Pigment based black ink 3 | Pigment based black ink 4 | Pigment based black ink 5 | Dye based black ink | Pigment based red ink 1 | Pigment based red ink 2 | Pigment based red ink 3 | Pigment based red ink 4 | Pigment based red ink 5 | Dye based red ink |
| Ink composition (wt %) | Water (ion-exchanged water) | 39.0 | 39.0 | 39.0 | 39.0 | 39.0 | 68.0 | 67.0 | 67.0 | 65.45 | 67.0 | 67.0 | 68.5 |
|  | Glycerin | 25.5 | 26.0 | 25.0 | 23.0 | 27.0 | 24.0 | 27.0 | 27.0 | 25.45 | 24.0 | 28.0 | 24.0 |
|  | Dipropylene glycol-n-propyl ether | 2.0 | 2.0 | 3.0 | 5.0 | 1.0 | 5.0 | 2.0 | 2.0 | 2.5 | 5.0 | 1.0 | 5.0 |
|  | Propylene glycol-n-propyl ether | 0.5 | — | — | — | — | — | — | — | — | — | — | — |
|  | CAB-O-JET 300 (*1) | 33.0 | 33.0 | 33.0 | 33.0 | 33.0 | — | — | — | — | — | — | — |
|  | Food black 2 | — | — | — | — | — | 3.0 | — | — | — | — | — | — |
|  | C.I. pigment red 122 | — | — | — | — | — | — | — | — | 3.45 | — | — | — |
|  | C.I. pigment red 177 | — | — | — | — | — | — | — | 3.0 | — | — | — | — |
|  | C.I. pigment red 254 | — | — | — | — | — | — | 3.0 | — | — | — | 3.0 | — |
|  | C.I. pigment red 264 | — | — | — | — | — | — | — | — | — | 3.0 | — | — |
|  | C.I. acid red 407 | — | — | — | — | — | — | — | — | — | — | — | 2.5 |
|  | C.I. pigment yellow 74 | — | — | — | — | — | — | — | — | 1.5 | — | — | — |
|  | Polyoxyethylene lauryl ether ammonium sulfate (*2) | — | — | — | — | — | — | 1.0 | 1.0 | 1.65 | 1.0 | 1.0 | — |
| Evaluation | Dynamic surface tension (mN/m) | 42.3 | 44.0 | 40.7 | 37.4 | 48.2 | — | 42.6 | 42.8 | 40.5 | 36.2 | 47.0 | — |

(*1): product of Cabot Corporation; carbon black concentration = 15 wt %, concentration in ink (carbon black concentration with respect to the total amount of the ink) = 5 wt %
(*2): average polymerization degree of oxyethylene = 12
* Each ink composition represents the actual ink component concentrations contained in the total amount of the ink in weight percent.

TABLE 2

|  |  | Yellow ink (wt %) | | Magenta ink (wt %) | | Cyan ink (wt %) | |
| --- | --- | --- | --- | --- | --- | --- | --- |
|  |  | Dye based yellow ink | Pigment based yellow ink | Dye based magenta ink | Pigment based magenta ink | Dye based cyan ink | Pigment based cyan ink |
| Ink composition (wt %) | Water (ion-exchanged water) | 69.0 | 67.0 | 68.5 | 66.55 | 68.1 | 67.0 |
|  | Glycerin | 24.0 | 24.0 | 24.0 | 23.05 | 24.0 | 24.0 |
|  | Dipropylene glycol-n-propyl ether | 5.0 | 5.0 | 5.0 | 5.0 | 5.0 | 5.0 |
|  | C.I. pigment red 122 | — | — | — | 4.05 | — | — |
|  | C.I. reactive red 180 | — | — | 2.5 | — | — | — |
|  | C.I. pigment blue 15:3 | — | — | — | — | — | 3.0 |
|  | C.I. direct blue 199 | — | — | — | — | 2.9 | — |
|  | C.I. pigment yellow 74 | — | 3.0 | — | — | — | — |
|  | C.I. direct yellow 86 | 0.4 | — | — | — | — | — |
|  | C.I. direct yellow 132 | 1.6 | — | — | — | — | — |
|  | Polyoxyethylene lauryl ether ammonium sulfate (*1) | — | 1.0 | — | 1.35 | — | 1.0 |

(*1): average polymerization degree of oxyethylene = 12
* Each ink composition represents the actual ink component concentrations contained in the total amount of the ink in weight percent.

Examples 1 to 5 and Comparative Examples 1 to 5

The water based ink sets for ink-jet recording having the ink combinations shown in Table 3 were composed by use of the black inks, the red inks, the yellow inks, the magenta inks and the cyan inks shown in Tables 1 and 2. In the water based ink sets for ink-jet recording employed in Examples 1 to 5, a pigment was employed as the coloring agent contained in each of the black inks and the red inks, and a water soluble dye was employed as the coloring agent contained in each of the yellow ink, the magenta ink and the cyan ink. The water based ink sets for ink-jet recording employed in Comparative Examples 1 to 5 include ink sets which employ a dye as the coloring agent contained in the black ink, ink sets which do not employ the red ink, an ink set which employs a dye as the coloring agent contained in the red ink, and an ink set which employs a pigment as the coloring agent contained in each of the yellow ink, the magenta ink and the cyan ink.

The inks composing each of the ink sets were filled in a predetermined cartridge, and the cartridge was attached to a digital multifunction device equipped with an ink-jet printer (MFC-5200J, product of Brother Industries, Ltd.) to perform printing on DATA COPY paper (product of m-real). In this case, text data to be printed in black was printed by use of the black ink only, and text data to be printed in red was printed by use of the red ink only.

The evaluation of the feathering, the drying characteristics on paper, the water resistance and the lightfastness of the water based ink sets for ink-jet recording was performed for printed objects obtained by printing text data to be printed in black and in red by use of the black ink and the red ink, respectively. The evaluation of the color reproducibility was performed for printed patterns printed by changing the mixing ratio of the yellow ink, the magenta ink and the cyan ink.

Evaluation of Feathering

Feathering is fine scale blurring of a penetrated ink on paper when a single ink is employed for printing. The feathering evaluation was performed only for the black inks and the red inks in which the print quality of text is important. The influences of feathering on an image were visually observed and evaluated by the following criteria. The results are shown in Table 3.

"AA": No feathering is found.
"A": The feathering is almost unnoticeable.
"B": The feathering is noticeable. Practically problematic.
"C": The feathering is highly noticeable. Practically unsuitable.

Evaluation of Drying Characteristics on Paper

Drying characteristics on paper are the drying characteristics of an ink on paper after printing. The evaluation of drying characteristics on paper was performed only for the black inks and the red inks in which the print quality of text is important. Printed objects were rubbed with a finger at 15 seconds after the printing. Subsequently, blurring of the ink was visually observed, and the influences of the rubbing on an image were evaluated by the following criteria. The results are shown in Table 3.

"AA": No blurring of the ink is found.
"A": The blurring of the ink is almost unnoticeable.
"B": The blurring of the ink is noticeable. Practically problematic.
"C": The blurring of the ink is highly noticeable. Practically unsuitable.

Evaluation of Water Resistance

The evaluation of water resistance was performed only for the black inks and the red inks in which the print quality of text is important. The paper in which objects were printed was immersed in tap water for 5 minutes. Subsequently, the blurring of the ink on the printed paper was visually observed, and the effects of the immersion on an image were evaluated by the following criteria. The results are shown in Table 3.

"AA": No blurring of the ink is found.
"A": The blurring of the ink is almost unnoticeable.
"B": The blurring of the ink is noticeable. Practically problematic.
"C": The blurring of the ink is highly noticeable. Practically unsuitable.

Evaluation of Lightfastness

The evaluation of lightfastness was performed only for the black inks and the red inks in which the print quality of text is important. The evaluation was performed by means of a high energy xenon weather meter SC750-WN (available from Suga Test Instruments Co., Ltd.). The paper in which objects were printed was irradiated with light radiated from a xenon light source for 30 hours at a room temperature of 25° C., a humidity of 50% RH, and an irradiance of 100 W/m$^2$ (300 to 400 nm). The colors before and after the evaluation test were measured by means of Spectro Scan (light source: $D_{65}$, field of view: 2°, available from Gretag Macbeth), and the color difference ΔE in the L*a*b* calorimetric system standardized by CIE (Commission Internationale de l'Eclairage) before and after the evaluation test was determined by the equation below. The color difference ΔE was evaluated by the following criteria, and the results are shown in Table 3.

"AA": ΔE is less than 5.
"A": ΔE is 5 or higher and less than 10.
"B": ΔE is 10 or higher and less than 20.
"C": ΔE is 20 or higher.

$$\Delta E = \{(\Delta L^*)^2 + (\Delta a^*)^2 + (\Delta b^*)^2\}^{1/2} \qquad \text{(Eq. 2)}$$

In the Eq. 2, ΔL* is the difference in lightness before and after the evaluation test, Δa* is the difference in saturation along the red-green direction before and after the evaluation test, and Δb* is the difference in saturation along the yellow-blue direction before and after the evaluation test.

Evaluation of Color Reproducibility

The evaluation of color reproducibility was performed by visually observing printed samples, and the color reproducibility was evaluated by the following criteria. The results are shown in Table 3.

"AA": The color reproducibility is excellent.
"A": The color reproducibility is satisfactory.
"B": The color reproducibility is slightly unsatisfactory. Practically problematic.
"C": The color reproducibility is clearly unsatisfactory. Practically unsuitable.

TABLE 3

|  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Ink set | Black ink | Pigment based black ink 1 | Pigment based black ink 2 | Pigment based black ink 3 | Pigment based black ink 4 | Pigment based black ink 5 | Dye based black ink | Pigment based black ink 4 | Pigment based black ink 4 | Dye based black ink | Pigment based black ink 4 |

TABLE 3-continued

|  |  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
|  | Red ink |  | Pigment based red ink 1 | Pigment based red ink 2 | Pigment based red ink 3 | Pigment based red ink 4 | Pigment based red ink 5 | — | — | Dye based red ink | Pigment based red ink 2 | — |
|  | Yellow ink |  | Dye based yellow ink | Dye based yellow ink | Dye based yellow ink | Dye based yellow ink | Dye based yellow ink | Dye based yellow ink | Dye based yellow ink | Dye based yellow ink | Dye based yellow ink | Pigment based yellow ink |
|  | Magenta ink |  | Dye based magenta ink | Dye based magenta ink | Dye based magenta ink | Dye based magenta ink | Dye based magenta ink | Dye based magenta ink | Dye based magenta ink | Dye based magenta ink | Dye based magenta ink | Pigment based magenta ink |
|  | Cyan ink |  | Dye based cyan ink | Dye based cyan ink | Dye based cyan ink | Dye based cyan ink | Dye based cyan ink | Dye based cyan ink | Dye based cyan ink | Dye based cyan ink | Dye based cyan ink | Pigment based cyan ink |
| Printing test/ evaluation | Feathering | Black | AA | AA | AA | A | AA | C | A | A | C | A |
|  |  | Red | AA | AA | AA | A | AA | C | C | C | AA | B |
|  | Drying characteristics on paper | Black | AA | AA | AA | AA | A | AA | AA | AA | AA | AA |
|  |  | Red | AA | AA | AA | AA | A | AA | AA | AA | AA | AA |
|  | Water resistance | Black | AA | AA | AA | AA | AA | C | AA | AA | C | AA |
|  |  | Red | AA | AA | AA | AA | AA | C | C | C | AA | AA |
|  | Lightfastness (*1) | Black | AA ($\Delta E = 2$) | AA ($\Delta E = 2$) | AA ($\Delta E = 2$) | AA ($\Delta E = 2$) | AA ($\Delta E = 2$) | A ($\Delta E = 6$) | AA ($\Delta E = 2$) | AA ($\Delta E = 2$) | A ($\Delta E = 6$) | AA ($\Delta E = 2$) |
|  |  | Red | AA ($\Delta E = 4$) | A ($\Delta E = 6$) | AA ($\Delta E = 4$) | A ($\Delta E = 7$) | AA ($\Delta E = 4$) | C ($\Delta E = 24$) | C ($\Delta E = 24$) | B ($\Delta E = 18$) | A ($\Delta E = 6$) | A ($\Delta E = 5$) |
|  | Color reproducibility |  | AA | AA | AA | AA | AA | Aa | AA | AA | AA | C |

(*1): Δ in lightfastness = the color difference before and after the evaluation test.

All of Examples 1 to 5 employ the water based ink sets for ink-jet recording comprising the pigment based black and red inks each employing a pigment as the coloring agent, and the dye based yellow, magenta and cyan inks each employing a water soluble dye as the coloring agent. Therefore, the feathering of the black ink and the red ink was satisfactorily prevented, and the drying characteristics on paper and the lightfastness of the black ink and the red ink were excellent.

The pigment based black and red inks of Examples 1 to 3 have a dynamic surface tension at a lifetime of 100 ms and 25° C. of 40 mN/m or more and 45 mN/m or less. Therefore, the balance between the feathering and the drying characteristics on paper for the black color and the red color was better than that of the other Examples.

On the other hand, in contrast to the Examples, the water based ink sets for ink-jet recording employed in Comparative Examples 1 to 3 do not employ the red ink or employs the dye based red ink in the case where a red ink is employed. Therefore, the feathering of the black and red colors was not satisfactorily prevented, and the water resistance of the black and red colors was unsatisfactory.

The black ink employed in Comparative Example 4 is a dye based black ink. Therefore, the feathering of the black color was not satisfactorily prevented, and the water resistance of the black color was unsatisfactory. In Comparative Example 5, all of the inks are pigment based inks. Thus, the feathering of the black color was satisfactorily prevented, and the water resistance and the lightfastness of the black and red colors were satisfactory. However, the color reproducibility was clearly unsatisfactory as compared to the Examples. Also, since the pigment based red ink is not included in the ink set, red color of text is expressed by use of the pigment based yellow and magenta inks. Therefore, blurring was found due to the landing error of the yellow and magenta inks.

In the water based ink set for ink-jet recording of the present invention, a red ink employing a pigment as a coloring agent is added to the water based ink set for ink-jet recording comprising a black ink employing a pigment as a coloring agent, and yellow, magenta and cyan inks each employing a water soluble dye as a coloring agent, and the black ink and the red ink are employed for printing text data in black and in red, respectively. Therefore, feathering on the edges of the objects in the text data printed in black and in red is suppressed, and the water resistance and the lightfastness of the printed objects are improved. In addition, a print quality of the red color is equivalent to that of the black color, and excellent color reproducibility is obtained.

The entire disclosure of the specification, claims and summary of Japanese Patent Application No. 2004-305514 filed on Oct. 20, 2004 is hereby incorporated by reference.

What is claimed is:

1. A water based ink set for ink-jet recording, the ink set comprising a black ink, a red ink, a yellow ink, a magenta ink and a cyan ink each comprising at least a coloring agent, water and a water soluble organic solvent, wherein
the coloring agent of each of the black ink and the red ink is a pigment, and the coloring agent of each of the yellow ink, the magenta ink and the cyan ink is a water soluble dye.

2. The water based ink set for ink-jet recording according to claim 1, wherein
the black ink and the red ink each have a dynamic surface tension at a lifetime of 100 ms of 40 mN/m or more and 45 mN/m or less as measured by a maximum bubble pressure method at 25° C.

3. The water based ink set for ink-jet recording according to claim 1, wherein
the red ink employs as the coloring agent at least one pigment selected from the group consisting of C.I. pigment red 122, 177, 254 and 264.

4. The water based ink set for ink-jet recording according to claim 1, wherein
the black ink employs carbon black as the coloring agent.

5. An ink-jet recording method for carrying out ink-jet recording comprising ejecting inks from an ink-jet head to adhere the inks to a recording material, where the inks constitute a water based ink set for ink-jet recording comprising at least a black ink containing a pigment as a coloring agent, a magenta ink containing a water soluble dye as a coloring agent, a yellow ink containing a water soluble dye as a coloring agent and a cyan ink containing a water soluble dye as a coloring agent, wherein
a red ink containing a pigment as a coloring agent is added to the water based ink set for ink-jet recording, and the black ink and the red ink are used for printing text data to be printed in black and in red, respectively.

6. The ink-jet recording method according to claim 5, wherein
the black ink is employed only for printing text data.

7. The ink-jet recording method according to claim 5, wherein
the red ink is employed only for printing text data.

8. The ink-jet recording method according to claim 5, wherein
the black ink and the red ink each have a dynamic surface tension at a lifetime of 100 ms of 40 mN/m or more and 45 mN/m or less as measured by a maximum bubble pressure method at 25° C.

9. The ink-jet recording method according to claim 5, wherein
the red ink employs as the coloring agent at least one pigment selected from the group consisting of C.I. pigment red 122, 177, 254 and 264.

10. The ink-jet recording method according to claim 5, wherein
the black ink employs carbon black as the coloring agent.

* * * * *